United States Patent Office 3,359,008
Patented Dec. 19, 1967

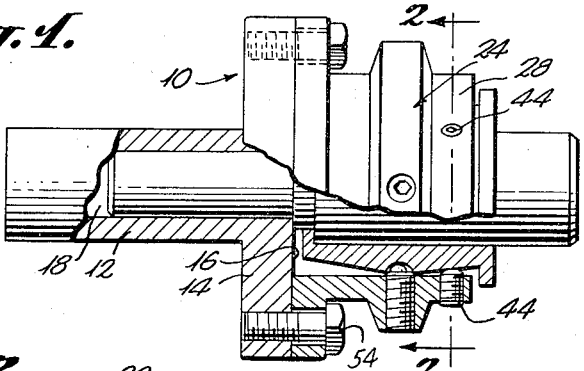
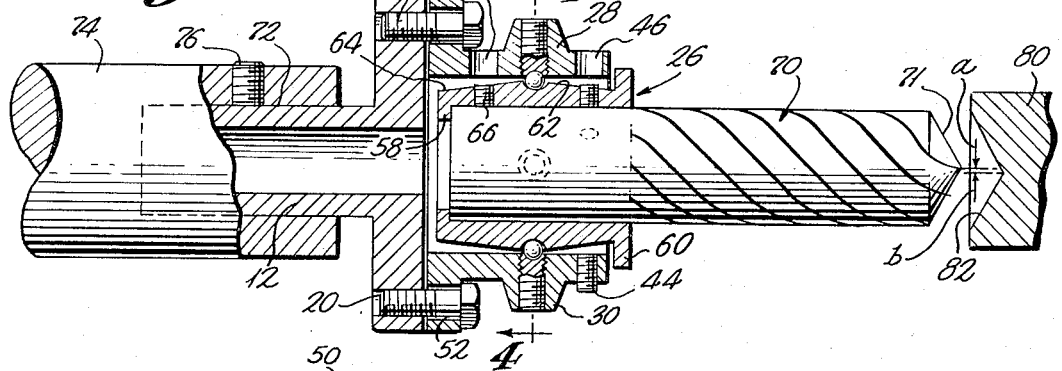
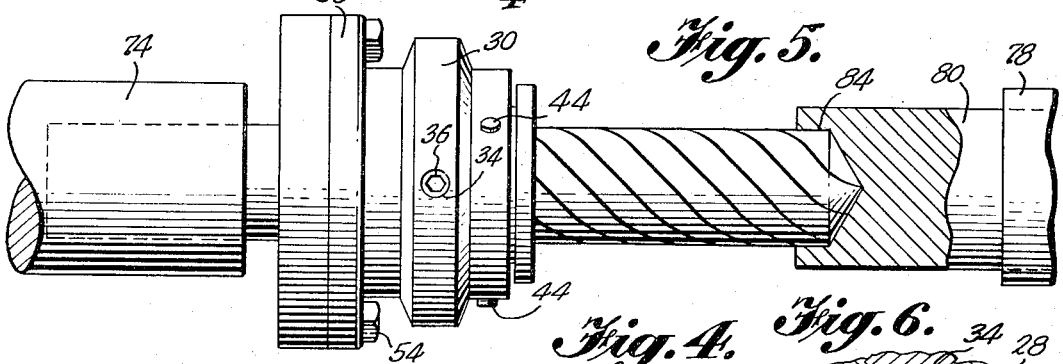
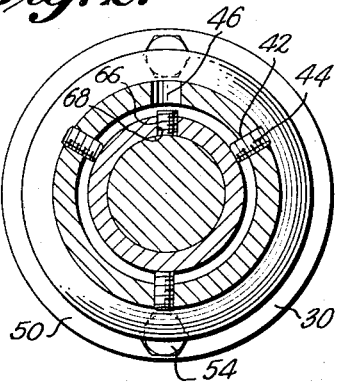
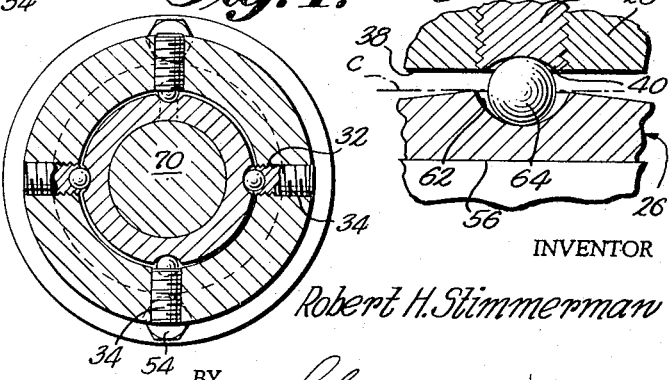
INVENTOR
Robert H. Stimmerman
BY Shoemaker and Mattare
ATTORNEYS

3,359,008
BORING TOOL HOLDER FOR DRILLING AND REAMING OPERATIONS
Robert H. Stimmerman, 957 Sebring Ave., R.D. 1, Pine City, N.Y. 14871
Filed Oct. 22, 1965, Ser. No. 500,935
8 Claims. (Cl. 279—16)

ABSTRACT OF THE DISCLOSURE

The driven spindle, tubular shank with flanged head part, flanged housing, and tool holder floating bushing are all arranged concentrically. The tubular shank is secured to the spindle. The flange of the head part is secured to the flange of the housing by bolts passing through apertures in the flange, which apertures are of materially greater diameter than the diameter of the bolts. The housing incloses the floating bushing and is secured thereto by ball-and-socket coupling means, and a tool is secured in the floating bushing by set screws.

This invention relates to improvements in tool holders and is directed particularly to an improved holder for carrying out drilling and reaming operations.

In the operation of boring and reaming a hole in a piece of stock in the turret lathe it is important that the reamer be accurately centered in order that the hole may be finished accurately.

It is an important object of the present invention to provide a new and improved holder for a drilling or reaming tool which is so constructed as to assure the accurate drilling and/or reaming of a hole in a piece of work.

It is a further important object to provide a new and improved holder for a cutting tool of the character stated, which will automatically correct any angular misalignment between the tool and material being drilled or reamed.

Still another object of the invention is to provide a tool holder of the character stated having parts which are easily and quickly adjusted for preliminarily receiving the drill or cutting tool and for holding the tool accurately while the tool is applied to the work to be brought into proper alignment with the work for correcting misalignment between the tool and the material to be drilled.

Still another object of the invention is to provide a tool holder having, in addition to means for automatically correcting angular misalignment, a means for facilitating the hand centering of the tool with respect to the work.

A still further object of the invention is to provide a tool holder of the character stated which is of relatively simple construction but is designed to be strong and durable and which embodies means whereby automatic alignment of the tool takes place during the drilling operation, with a minimum of friction and with minimum application of leverage on the holder parts from the cutting point of the tool.

More specifically, the invention embodies a light weight floating bushing for receiving the shank of a cutting tool which adjusts automatically to a true center of the stock.

Other objects and advantages of the invention will become apparent as the description of the same proceeds and the invention will be best understood from a consideration of the following detailed description taken in connection with the accompanying drawings forming a part of the specification, wherein:

FIG. 1 is a view partly in side elevation and partly in longitudinal section of the tool holder of the present invention showing the same with a master plug employed for centering the floating bushing true with the center line of the main body of the holder.

FIG. 2 is a sectional view taken transversely of the tool holder and the master plug, substantially on the line 2—2 of FIG. 1.

FIG. 3 shows the tool holder in longitudinal section and supporting a drill, in position between the tool spindle and a piece of work in which a pre-cut center has been formed.

FIG. 4 is a sectional view taken substantially in the plane of line 4—4 on FIG. 3.

FIG. 5 is a view in side elevation of the tool holder with the cutting tool advanced into the piece of work which is held in the work or stock spindle.

FIG. 6 is an enlarged sectional detail illustrating one of the four supporting balls for the floating bushing.

Referring now more particularly to the drawings, the numeral 10 generally designates the tool holder.

The numeral 12 generally designates a mounting shank which is formed integral with a head flange 14. The head flange has a flat front or forward face 16 and the shank is provided with a central bore 18 which opens through the center of the head flange 14.

The head flange is also provided with the diametrically located threaded bolt holes 20 which are parallel with the shank 12 and are adapted to receive hand set or adjusted clamping bolts 22.

The numeral 24 generally designates the main body part of the holder which is mounted upon the head flange as shown and which carries the floating bushing which is generally designated 26.

The main body part 24 of the tool holder is in the form of a tubular housing 28 which has formed therearound and midway of its ends, the relatively heavy rib 30 in which are formed the radially directed threaded openings 32 designed to receive setting screws 34 of the type having an outer end socket, as indicated at 36 in FIG. 5, for the reception of a wrench.

The screw holes 32 extend entirely through the body 28 and open upon the inner side in the passage or bore 38 of the body.

The inner end of each of the setting screws 34 is formed with a socket 40 for the reception of a bearing ball as hereinafter described.

The threaded holes 32 which receive the setting screws 34 are located in a common plane transversely of the body 28 and are spaced 90 degrees apart as illustrated in FIG. 4.

Formed in the part 28 of the main body part 24 between the rib 30 and the forward end of the main body part, are three screw threaded openings 42 located in the common plane transversely of the body part as shown in FIG. 2 and also as shown in this figure these threaded holes are spaced 120 degrees apart and receive the holding screws 44 which are employed, as hereinafter set forth, in the operation of setting up the tool holder, for securing a master plug in position.

There is also formed in the forward end portion 28 of the body part a radial bore 46 and at the opposite side of the rib 30 from this bore there is formed the corresponding bore 48. These bores are, as shown, to facilitate use of a wrench in the turning of tool holding screws, hereinafter described, carried by the floating bushing.

The inner end of the main body part 24 is defined by the encircling flange 50 which is preferably of the same width or diameter as the head flange 14 and this flange 50 is provided with the pair of diametrically spaced smooth bores or apertures 52 designed to be aligned with the threaded holes 20. These apertures 52 are of larger diameter than the holes 20 and are designed to receive the clamp bolts 22, which bolts are, as shown, of smaller diameter than the holes or apertures 52 and the heads 54 of the bolts are designed to bear against the flange 50 when the bolts are in adjusted operative position.

The floating bushing 26 is a tubular member having a bore longitudinally therethrough and terminating at its inner end in the stop flange 58.

The bushing is of approximately the same length as the bore 38 of the main body portion or may be slightly longer as illustrated with a terminal encircling flange at its outer or forward end as indicated at 60.

The overall or outside maximum diameter of the floating bushing, inwardly of the flange portion 60, is less than the inside diameter of the bore 38 of the main body portion and approximately midway between its ends the bushing is provided about its circumference, with the four bearing ball sockets 62 which are spaced 90 degrees apart and in the set up condition of the tool holder they are in the common plane with the sockets 40 and match these sockets to cooperate therewith in maintaining between the floating bushing and the main body portion, the bearing balls 64. The radii of the opposing pairs of sockets 40 and 62 are slightly greater than the arc of curvature of the balls 64 so that in the operative set-up of the tool holder the floating bushing has a slight degree of free rocking or swiveling movement relative to the encircling main body part 24.

As will be readily apparent, the degree of looseness of the swivel bushing or the amount of movement thereof relative to the main body part may be controlled by adjusting the setting screws 34.

The floating bushing 26 has the exterior surface formed with a double angle or double taper. One taper, designated 62, is at the forward end of the bushing while the opposite taper, designated 64, extends toward and to the rearward end of the bushing.

The angle of taper for each of the tapered portions 62 and 64 is approximately 5/1000 of an inch from the center line $c$ of the bearing, the socket 62 for which is of a depth approximately one half the diameter of the ball.

The oppositely extending tapered surfaces or tapers 62 and 64 might be described as frustums of cones with the bases meeting in a common plane perpendicular to the axis of the floating bushing and passing through the centers of the sockets 62 and the bearing balls 64. Thus, as will be readily obvious, the floating bushing may be secured against movement by increasing the pressure against the bearing balls by threading the screws 34 inwardly or by adjusting the screws 34 the bushing may have floating movement or free movement without being loose.

The tapering surfaces 62 and 64 permit the movement of the floating bushing, the degree of taper, of course, controlling the amount of floating movement which the bushing would have.

The numeral 66 designates a pair of set screws threaded in openings 68 formed radially through the wall of the bushing 26 and disposed on opposite sides of the transverse center of the bushing and aligned longitudinally thereof. These screws are of a well known type having polygonal sockets in their outer ends to receive a correspondingly shaped wrench and the screws are accessible through the bores 46 and 48 shown in FIG. 3 and one of which is shown in FIG. 2. These set screws 66 are employed for securing the shank of a drill or other tool, inserted into the floating bushing.

FIG. 3 illustrates a drill, generally designated 70, having the shank portion thereof inserted into the bushing 26 against the stop flange 58 and secured by the set screws 66.

In setting up the tool holder for use, the mounting shank 12 is secured in the bore 72 of the tool spindle 74, by means of the set screw 76.

The numeral 78 designates, in FIG. 5, the work or stock spindle in which is set the piece of work to be drilled and reamed, which is designated 80 and which has a pre-cut center 82 in the end thereof, which is directed toward the tool spindle and is substantially aligned with the tool holder, particularly the floating bushing 26.

Angular misalignment of the cutting tip of the tool with the pre-cut center is illustrated in an exaggerated manner by the parallel lines designated by the arrows $a$ and $b$. Such a misalignment, if checked with an indicator, might show a .003" run out at the shank end of the tool, having approximately .010" at the cutting point for a 2" length drill or a .005" taper. This may represent the condition when the tool is set up in the floating bushing for use and the steps followed in setting the tool in the tool holder or in the floating bushing are as follows:

In the first step of setting up the tool holder and drill after the shank 12 has been secured in the tool spindle, a master plug is employed to center the floating bushing 26 true with the center line of the main body part 24. The three adjusting screws are tightened against the floating bushing to secure the bushing and the plug in position. This positioning of the bushing is maintained by the screws 34 tightened against the bearing balls 64. This use of the master plug is used only one time for the first setting of the parts of the tool holder.

The next step is that of making the centering adjustment. After removal of the master plug the tool 70 is placed in the tool holder bushing and locked in place with the set screws 66. The described application of the master plug and securement thereof in position may be performed before mounting the shank 12 in the tool spindle or turret or after so mounting it as first described.

In the third step of setting up the tool holder, after the holder has been secured in place on the tool spindle or turret and clamped tightly by means of the set screw 76, the two clamp bolts 22 are loosened just enough to give free movement of the main body part 24. As previously stated, the drilled holes 52 in the main body part are larger than the shanks of the clamp bolts 22 by about 1/16" to allow for free movement of the body part for hand centering the drill to the pre-cut center 82 in the stock 80.

The fourth step in setting up the tool holder consists in advancing the tool spindle by hand feed until the cutting point 71 is tight against the angle of the pre-cut center 82. The work spindle revolving, the tool spindle is advanced into the stock approximately 3/8", as indicated at 84. The tool spindle is then stopped and the clamp bolts 22 are tightened.

If the true center has not been found by carrying out the prescribed operations, this operation of setting the tool holder is repeated.

When the true center has been found the three adjusting screws 44 are loosened to give free movement of the floating bushing 26 to automatically correct any angular misalignment in the next advancement of the drill into the stock, or the adjusting screws can be adjusted for a degree of float of the bushing 26, or the bushing can be held in a rigid position when used on a single spindle machine.

From the foregoing it will be seen that there is provided by the present invention a new easily set up and adjusted tool holder for carrying out drilling or reaming operation.

The floating bushing 26 will not turn in the main body part 24 as will be readily apparent, by reason of the fact that it is held in place by the steel bearing balls 64 which are positioned in the confronting sockets 40 and 62. However, the bushing 26 will have a floating movement which is substantially free of friction, or as nearly free of friction as possible, and takes little leverage from the cutting point of the tool and the floating bushing is moved to a true center of the stock.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by those claims.

I claim:

1. A misalignment correcting boring tool holder for mounting on a tool spindle between the same and a work spindle; comprising a head part, means for securing the head part in operative position on a tool spindle, a bushing for receiving the shank of a tool, a body part forming a housing for and enclosing the bushing, means for mounting said housing on said head part, said last named means permitting relative radial movement between said housing and said head part, and ball-and-socket coupling means between said bushing and housing and circumscribing said bushing in a plane perpendicular to the longitudinal axis of the latter and functioning to permit a substantially friction-free universal floating non-rotating movement of the bushing in and relative to the housing.

2. The invention according to claim 1, wherein said ball-and-socket coupling means includes a means adjustable radially of the bushing for modifying the degree of contact pressure between the balls and their sockets.

3. The invention according to claim 2, wherein said radially adjustable means, comprise screws carried by said housing and each having a socket in its inner end with a bearing ball seated therein and supported on an opposing surface of the bushing.

4. The invention according to claim 1, wherein the said ball-and-socket coupling means comprises four bearing balls spaced ninety degrees apart and opposing pairs of spherical depressions carried by the bushing and the housing with a ball between and in each pair of depressions, and wherein the radii of the depressions are appreciably greater than the radius of the balls.

5. The invention according to claim 4, wherein the depressions carried by the housing are contained in the inner ends of screw members forming a part of the housing for adjustment radially of the housing and bushing to change the degree of contact pressure between the balls and the socket forming depressions.

6. The invention according to claim 1, wherein said ball-and-socket coupling means includes a means adjustable radially of the bushing for modifying the degree of contact pressure between the balls and their sockets and the said radially adjustable means comprise screws carried by said housing and each having a socket in its inner end with a bearing ball seated therein and supported on an opposing surface of the bushing.

7. The invention according to claim 1, wherein said head part and means for securing the same to a tool spindle comprises a tubular shank carrying a flange, and said housing having a flange on one end, there being means for securing said flanges together comprising bolts passing through apertures in the flange of materially greater diameter than the diameter of the bolts, thus permitting said relative radial movement between said housing and said head part, and said ball-and-socket coupling means comprises four screw members threaded in apertures extending radially through the housing to the interior thereof and spaced ninety degrees apart around the housing and each having a ball socket in its inner end, the bushing having four corresponding ball sockets around its exterior surface each in opposed relation with a housing socket to form therewith a cooperating pair of sockets and each said pair of sockets having a bearing ball therein, and there being a means for securing a tool in said bushing.

8. The invention according to claim 7, wherein the last said means comprises set screws carried by and adjustable radially of the bushing, and the housing having smooth bore radial openings in the wall thereof positioned to facilitate application of a tool to the set screws to turn the latter.

References Cited
UNITED STATES PATENTS

| | | | |
|---|---|---|---|
| 1,334,898 | 3/1920 | Gyllsdorff | 279—16 |
| 2,498,148 | 2/1950 | Berritta | 279—16 |

FRANCIS S. HUSAR, *Primary Examiner.*